G. KATOR.
Bolt-Lock.

No. 217,692.  Patented July 22, 1879.

UNITED STATES PATENT OFFICE.

GEORGE KATOR, OF NORTHVILLE, MICHIGAN.

IMPROVEMENT IN BOLT-LOCKS.

Specification forming part of Letters Patent No. 217,692, dated July 22, 1879; application filed July 23, 1878.

*To all whom it may concern:*

Be it known that I, GEORGE KATOR, of Northville, in the county of Wayne and State of Michigan, have invented certain new and useful Improvements in Combined Washer and Bolt-Lock; and I do hereby declare that the following is a full, clear, and exact description of the invention, which will enable others skilled in the art to which it appertains to make and use the same, reference being had to the accompanying drawings, which form a part of this specification.

Figure 1:
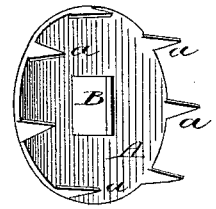
Figure 2:
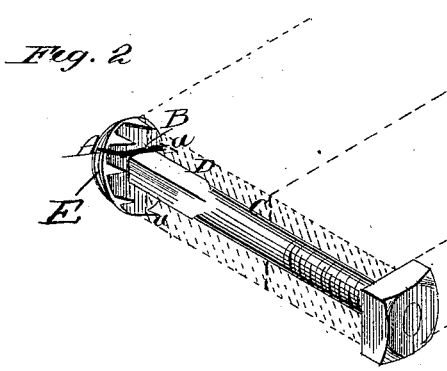
Figure 3:
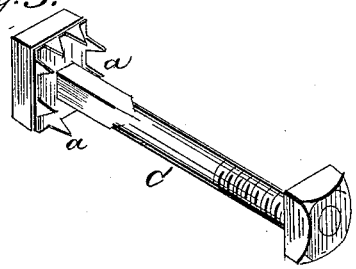

Figure 1 is a view, in perspective, of my improved washer and bolt-lock. Fig. 2 shows it in position upon the square shank next the head of the bolt, and Fig. 3 shows a differently-shaped bolt-head and washer in same position as in Fig. 2.

This invention relates to an improvement in washers for bolts; and it consists of a metallic washer having a square hole through its center and tooth-like projections on its under face, which penetrate the wood and hold it in place, thereby adapting it to perform both the offices of bolt-lock and washer when employed at the head of a square-shanked bolt, as will be hereinafter fully described, and particularly pointed out in the claim.

In the accompanying drawings similar letters of reference indicate like parts in the invention.

C is the bolt, which is provided with a square shank, D, and head E. A is the washer, having a square central perforation, B, and provided with sharp-pointed tooth-like projections or barbs $a$, which are bent so as to project upon its under face at right angles thereto, as shown in the drawings. The washer A is made of a size and shape corresponding to that of the under surface of the bolt-head E, the edges of which correspond with the edges of the washer.

In operation, the washer is adjusted upon the square shank of the bolt next to its head, as shown in Fig. 2 of the drawings. When the nut is tightened the teeth $a$ will be forced into the wood and prevent the bolt from turning. The washer being of the same size and shape as the bolt-head, the pressure of the latter is distributed evenly along the edges of the washer, thus tending to drive the teeth into the wood without causing either the washer or the teeth to break or bend.

When nuts have been in position upon their bolts for some time it is usually difficult to remove them, because the bolts will turn with them. This difficulty is completely overcome by using my improved washer, which firmly secures the bolt in position.

Having thus described my invention, I claim and desire to secure by Letters Patent of the United States—

The combination, with a bolt having square shank D and head E, of the washer A, of a size and shape corresponding to that of the bolt-head, and having the square central perforation, B, and sharp teeth or barbs $a\,a$ upon its under surface, at right angles thereto, substantially as and for the purpose herein shown and specified.

In testimony that I claim the foregoing as my own I have hereto affixed my signature in presence of two witnesses.

GEORGE KATOR.

Witnesses:
HIRAM B. THAYER,
JAMES H. KELLY.